INVENTOR.
JAMES E. SARAZIN
BY Kenwood Ross
ATTORNEY.

United States Patent Office 3,287,550
Patented Nov. 22, 1966

3,287,550
VEHICLE LIGHT
James E. Sarazin, 208 2nd Ave., Pittsfield, Mass.
Filed Aug. 27, 1964, Ser. No. 392,407
2 Claims. (Cl. 240—8.2)

My invention relates to new and useful improvements in illuminating means for motor vehicles and more particularly to the provision of an auxiliary lighting means for illuminating the area of a highway at one side of and rearwardly of the vehicle to increase night driving safety.

As is well known, the glare of oncoming automobile headlights is extremely confusing to the drivers of passing cars. Even in the instance of dimming, the turning off or down of the relatively more brilliant driving lights of the approaching vehicle is inclined to leave the eyes of the vehicle driver in such a partially blinded condition that the surrounding darkness is momentarily impenetrable with the omnipresent danger that the cars may pass each other without either driver being able to see the road directly ahead of him, or the other car.

It is, accordingly, a primary object of the instant invention to furnish a supplemental light system which is complementary to the conventional light system for aiding the passing of cars approaching from opposite directions by way of illuminating thereby portions of the road, hitherto not illuminated, namely the portion adjacent the center of the road strip and the opposite side of the road astride and rearwardly of the car, with an intense and diffused light such as to preclude for the driver of the oncoming car, approaching from the opposite direction, the usual dark patches brought about by the intensity of the conventional lights of the car. Such supplemental light is directed somewhat downwardly and rearwardly so as to lie along an axis intersecting the axis of the road and in such manner that the rays therefrom do not blind the driver of the oncoming car approaching from the opposite direction, and at the same time, do not interfere with the vision of the operator of the following car.

Another object hereof is to provide means for showing more clearly to the operator of another oncoming car his own driving lane so as to eliminate for him the dark spot encountered when cars are about to pass each other.

It is generally accepted as a rule of the road that upon approaching a vehicle traveling in the opposite direction, the powerful headlights which produce a glare in the eyes of the oncoming driver are turned off and replaced by regulation passing lights. This operation is usually effected when the approaching vehicles are about 350 yards or more apart. The regulation passing lights allow the two vehicles to advance safely until they are about 100 yards apart. At this point each car is about to enter the dark zone on the left side of the other.

The period in which the cars approach from a point of about 350 yards apart to a point of about 100 yards apart can be considered to be the first phase of the passing. The second phase begins when the cars are about 100 yards apart and terminates when the cars are alongside each other and the bright head lights are again turned on.

This second phase is the shortest but most dangerous, as the dazzling of the regulation passing lights compels the drivers to go on blind without noticing obstacles which could appear during the passing or immediately thereafter.

An object of this invention is to furnish the cars with a light system complementary to the regulation lights for passing, that will illuminate the side of each car (each car illuminates the portion of the road where the other has to go) during the second phase of the passing, with a very intense and diffused light avoiding as far as possible dark patches in the illuminated zone. This light is directed almost parallel to the axis of the road and in such a way as not to dazzle either the coming or the following car.

Another object of the invention is to provide a supplemental or auxiliary light on that side of a motor vehicle which oncoming vehicles pass, which light will fully illuminate the road not only at the side of the vehicle but also far enough to the rear thereof as to disclose another vehicle following behind or obstruction or sharp bend in the road, or to fully disclose the highway and any dangers that may exist for a vehicle approaching from the opposite direction and about to pass by the first vehicle.

Another object is to provide a side light for an automobile or other motor vehicle wherein a lamp is recessed in the left front fender of the vehicle functioning to illuminate the side thereof as well as the adjacent land area astride and rearwardly of the vehicle.

Another object of the invention is to provide a lighting apparatus for automotive vehicles that will prevent the rays from being directed into the eyes of the drivers of the vehicle carrying the lighting apparatus, or of the oncoming vehicle or of a following vehicle.

A still further object is to provide an auxiliary lamp carried at the side of an automobile fender which is simple in construction and inexpensive in manufacture and may be installed in position thereon in a simple and practical manner and which at the same time is neat and attractive in appearance so as to blend with contemporary automobile design and otherwise well adapted for the purposes for which intended.

Still another object of my invention is the provision of an auxiliary light means for an automotive vehicle which may be used independently of the standard lighting equipment on the vehicle, when and if desired.

Other objects and advantages reside in the details of construction and operating as more fully hereinafter described and claimed, reference being had to the accompanying drawing, forming a part hereof wherein:

Figure 1:
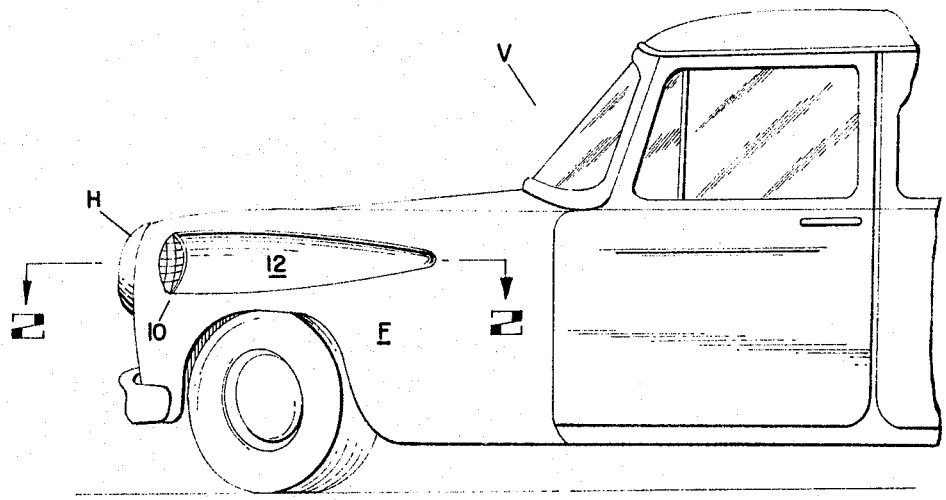
FIG. 1 is a view in side elevation showing my auxiliary lighting means mounted in position in a left front automobile fender.

With continued reference to the drawing, an auxiliary lighting device is shown in FIG. 1 and is indicated generally by 10. As shown, the auxiliary lighting device is associated with one of the fenders F of a typical contemporary motor vehicle V equipped with standard headlights H, only one of which is shown.

While the device is shown as being located on the left front fender, it will of course be understood that same may be located on the right front fender for accommodating locales where the driving customs and laws vary, as for example in England.

Auxiliary lighting device 10 is positioned rearwardly of one of the headlights H, the one on the left side of the vehicle, in a well or depression 12 formed in the fender F accommodating said headlight H and being of substantially elliptical and elongate configuration or generally paraboloidal and generally horizontally disposed in substantial axial alignment with and rearwardly of the headlight so as to allow in itself a distinctive trim element on the vehicle blending with other trim elements thereof.

Auxiliary light 10 is fixed by clamps 14 or any other suitable means in a annular opening 16 provided in fender F rearwardly of headlight H, the said opening communicating with well or depression 12.

Well or depression 12 is arcuate in vertical cross section and diverges inwardly from the outer surface of fender F at a point rearwardly of auxiliary light 10 so as to communicate at its opposite end with opening 16.

Auxiliary light 10 comprises a usual parabolic lamp 18 including a casing, lens, reflector, socket at the reflector vertex and the bulb positioned therein and carrying a lead 20 for energizing the filaments of the bulb and being connected to the usual headlight switch (not shown) or to a separate switch (also not shown) suitably located such as on the vehicle floorboard, or dashboard or steering wheel and connected to the automobile battery.

It should here be noted that my auxiliary light may be used in conjunction with the lighting system usually carried by an automobile or it may be used independently thereof, as desired. If used in conjunction with the standard lighting system, a switch is provided whereby the conventional lights may be dimmed when an oncoming vehicle is approaching, and the auxiliary light switched on.

The configuration of the well or depression 12 is such that when the lamp is lighted, light beams therefrom are directed angularly outwardly and rearwardly so as to illuminate not only the side of the vehicle and the area W of the roadway (see FIG. 3) at the side of the vehicle adjacent the roadway center strip X, but also the area Y of the roadway immediately behind the vehicle, and the area Z of the roadway on the opposite side of the road.

Figure 3:
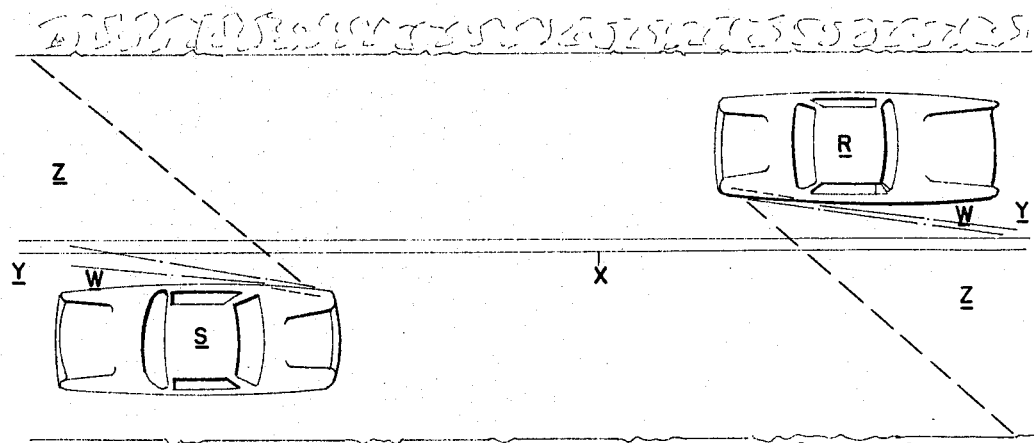
FIG. 3 is a diagrammatic view in top plan of two passing vehicles, each of which is equipped with the auxiliary lighting means of the invention.

As seen in FIG. 3, when the vehicles R and S are about to pass each other on the opposite sides of center strip X of the roadway, the respective auxiliary lights 10 are lighted so that the center strip adjacent each vehicle is illuminated, as well as the areas rearwardly thereof.

In the case of the device here shown, the light is so arranged as to cast the light upon the roadway wherefor it is illuminated to the side and to the rear of the car so that the driver of the passing car can readily see the roadway to the side and rear of the car he is passing. One half of the roadway to the rear of the car is fully lit up for 100 feet or more leaving dark the half of the roadway to the rear of the car so as not to glare in the eyes of a driver in a vehicle following.

Figure 2:
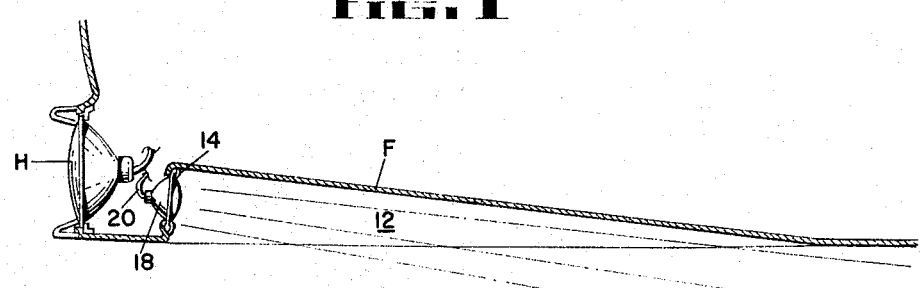
FIG. 2 is a sectional view on the line 2—2 of FIG. 1.

As shown in FIG. 2, the disposition of lamp 18 in opening 16 is such that the light beams are directed downwardly, whereby they will not shine in the eyes of drivers of any following vehicles.

While only one auxiliary light has been shown in the drawing, it will be understood that same could be mounted upon both front fenders of the vehicle, if desired, to illuminate the highway at the sides of the vehicle for various purposes incident to night driving.

In view of the foregoing description taken in conjunction with the accompanying drawing it is believed that a clear understanding of the construction, operation and advantages of the device will be quite apparent to those skilled in this art, a more detailed description is accordingly deemed unnecessary.

I claim:

1. An auxiliary lighting system for automotive vehicles comprising in combination with an automotive vehicle, an auxiliary lamp, a generally elliptically-shaped substantially horizontally-disposed well provided in one of the vehicle fenders, said well being disposed rearwardly of and in substantial axial alignment with one of the vehicle headlights, said auxiliary lamp being mounted in said well so as to be disposed inside the plane of the fender and so as to project beams of light obliquely outwardly rearwardly and downwardly relative to the vehicle.

2. An auxiliary lighting system according to claim 1 wherein said auxiliary lamp is associated with each of the vehicle front fenders.

References Cited by the Examiner
UNITED STATES PATENTS 1,655,571   1/1928   Sims _____ 240—8.2

FOREIGN PATENTS 536,755   4/1955   Belgium.
737,150   10/1932   France.
932,068   2/1947   France.
1,251,104   12/1960   France.
602,518   3/1960   Italy.

NORTON ANSHER, *Primary Examiner.*

EVON C. BLUNK, *Examiner.*